(12) United States Patent
Shimogama

(10) Patent No.: US 6,498,448 B2
(45) Date of Patent: Dec. 24, 2002

(54) MOTOR BREAK RELEASING DEVICE

(75) Inventor: Shigeru Shimogama, Hyogo (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/873,116

(22) Filed: Jun. 1, 2001

(65) Prior Publication Data

US 2002/0017882 A1 Feb. 14, 2002

(30) Foreign Application Priority Data

Jun. 1, 2000 (JP) ........................................ 2000-164292

(51) Int. Cl.[7] ................................................. H07P 3/00
(52) U.S. Cl. ........................ 318/362; 318/364; 318/370; 318/372; 303/68; 192/222; 192/226
(58) Field of Search ................................. 318/362, 364, 318/370, 372; 303/68; 192/222, 226

(56) References Cited

U.S. PATENT DOCUMENTS

| | | | | |
|---|---|---|---|---|
| 5,083,634 A | * | 1/1992 | Yonemoto | .................... 187/109 |
| 5,139,121 A | * | 8/1992 | Kumura et al. | ............. 192/1.43 |
| 5,333,706 A | * | 8/1994 | Mori | ........................... 188/156 |
| 5,449,992 A | * | 9/1995 | Geiger et al. | ................ 318/362 |
| 5,552,686 A | * | 9/1996 | Schmid et al. | ............... 318/362 |
| 5,893,432 A | * | 4/1999 | Nguyen et al. | .............. 187/290 |
| 6,294,887 B1 | * | 9/2001 | Shimogama et al. | ........ 318/362 |

FOREIGN PATENT DOCUMENTS

JP   8-171411   7/1996

* cited by examiner

Primary Examiner—Robert E. Nappi
Assistant Examiner—Rina I. Duda
(74) Attorney, Agent, or Firm—Rossi & Associates

(57) ABSTRACT

A motor brake releasing device includes an electromagnetic brake for locking a motor shaft and a switch mounted between the electromagnetic brake and a releasing-power-supply for the brake. The switch can be operated by an AND signal produced by a motor driving signal and a motor-brake-release-permitting signal. This structure allows a motor brake to be released when a motor driving system encounters an obstacle, although the motor is left free. The structure also can prevent a final object of the motor shaft from dropping due to its own weight.

10 Claims, 8 Drawing Sheets

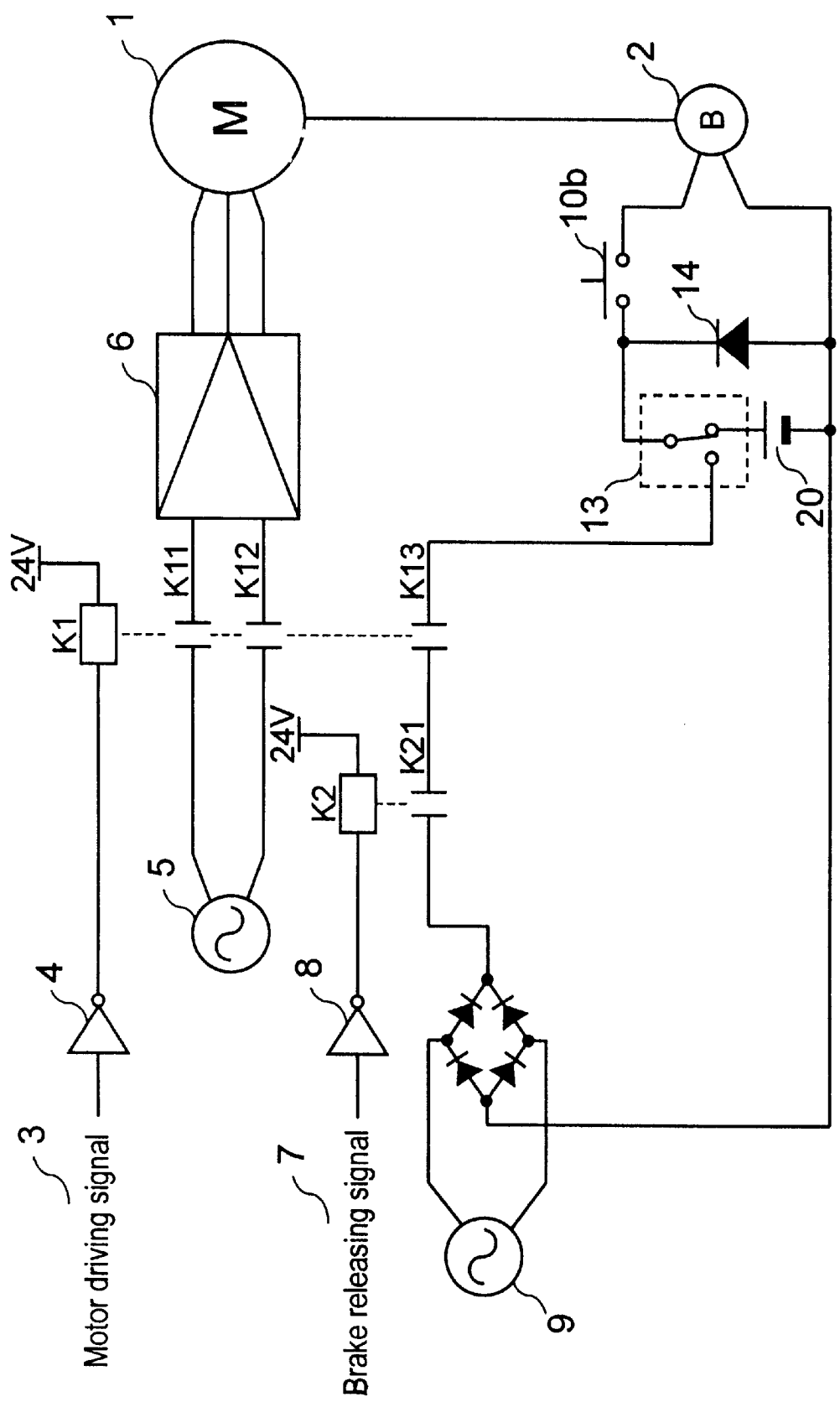

MOTOR BREAK RELEASING DEVICE

FIELD OF THE INVENTION

The present invention relates to a break releasing device of a motor equipped in an apparatus having a mechanism locking a motor shaft when the power is turned off.

BACKGROUND OF THE INVENTION

A motor driving device for driving a motor and a break releasing device for releasing an electromagnetic break, which locks a motor shaft, have been independently provided, and the electromagnetic break cannot be released by hand. Because of this independent installation of the motor driving device and the break releasing device, the following inconveniences have occurred: When a motor driving system encounters a trouble, a motor does not produce torque because a driving current stops flowing to the motor. Although no torque is available in the motor, the electromagnetic brake is released or left released. As a result, a final object of the motor shaft may drop due to its own weight when the final object works in the gravity direction. When the final object interferes with an obstacle, a servo control system detects an overload status, so that the interference status cannot be avoided because the motor cannot be driven.

SUMMARY OF THE INVENTION

The present invention addresses the problems discussed above and aims to prevent a motor brake from being released at motor's non-driven status and provide a motor-brake-releasing-device assuring safer operation than ever.

The motor-brake-releasing-device of the present invention comprises the following elements:
  an electromagnetic brake for locking a motor shaft; and
  a switch disposed between the electromagnetic brake and its releasing-power-supply, and the switch being operated by an AND signal of a motor driving signal and a motor-brake releasing signal. This structure prevents the brake from being released when the motor is not driven, thus the structure assures safer operation of the motor than ever.

Another motor-brake-releasing-device of the present invention comprises the following elements:
  an electromagnetic brake for locking a motor shaft;
  a battery functioning as a power supply for releasing the electromagnetic brake; and
  a switch disposed between the battery and the electromagnetic brake for releasing a motor brake. This structure employs the battery as the power supply for releasing the electromagnetic brake, thus it is beneficial that the motor brake can be released even when a power supply of a servo-control system is not powered on.

BRIEF DESCRIPTION OF THE DRAWINGS

FIG. 8 is a circuit diagram of a motor driving device and a motor-brake-releasing-device in accordance with a seventh exemplary embodiment of the present invention.

DETAILED DESCRIPTION OF THE EXEMPLARY EMBODIMENTS

Figure 2:
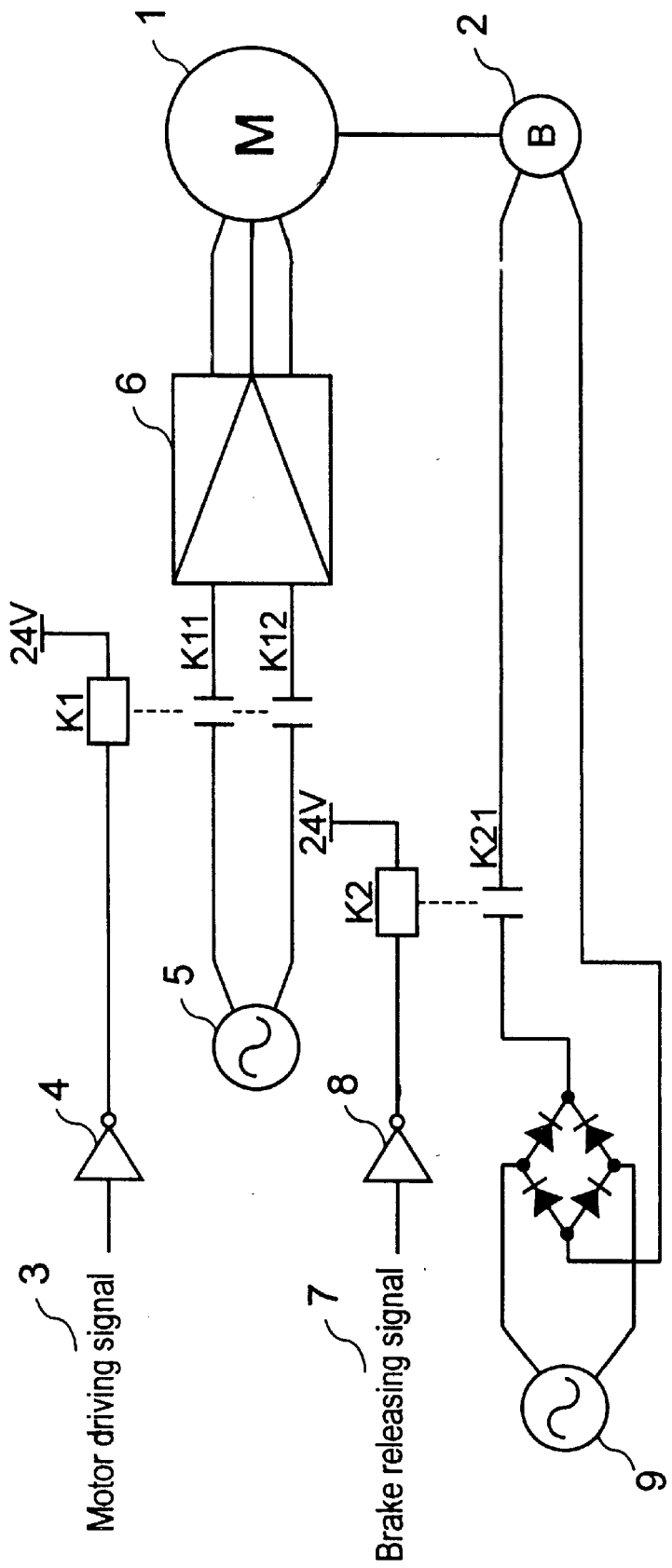
FIG. 2 is a circuit diagram in which a motor driving device is compared with a motor-brake-releasing-device of a basic type.

FIG. 2 is a circuit diagram in which a motor driving device is compared with a motor-brake-releasing-device of a basic type. In FIG. 2, when motor 1 is not driven, a motor shaft is locked with brake 2, thereby fixing a final object of the motor.

When a controller (not shown) drives motor 1, a latch circuit (not shown) turns motor-driving-signal 3 active, and energizes relay K1—functioning as a switch—via driver 4. Then first contact K11 and second contact K12 of relay K1 close in response to the energizing of relay K1, so that ac power supply 5 powers servo-amplifier 6, which drives motor 1. A servo control system (not shown) starts controlling using signals of an encoder (not shown) indicating rotating amount of the shaft of motor 1.

Then the servo control system confirms servo-lock-status, counts timing to turn brake-releasing-signal 7 active through a latch circuit (not shown), and energizes relay K2—functioning as a switch—via driver 8. Contact K21 of relay K2 closes responsive to the energizing of relay K2, and an electromagnetic brake 2 is powered by a power supply derived from the full-wave rectification of ac power supply 9, whereby brake 2 locking a motor shaft is released. As discussed above, there is no problem in a normal operation.

However, when the servo control system carries out, with some reason, driving the motor and releasing the brake independently, the following problem occurs: For instance, in FIG. 2, assume that the final object, driven by the motor, has a mechanism working in the gravity direction. In this case, when only motor-driving-signal 3 turns to non-active from servo-lock status, i.e., when the servo control system of motor 1 is shut off, the final object is to drop due to its own weight if brake 2 is left released.

A motor-brake-releasing-device of the present invention, this device being expected to solve the problem discussed above, is demonstrated hereinafter with reference to the accompanying drawings.

First Exemplary Embodiment

Figure 1:
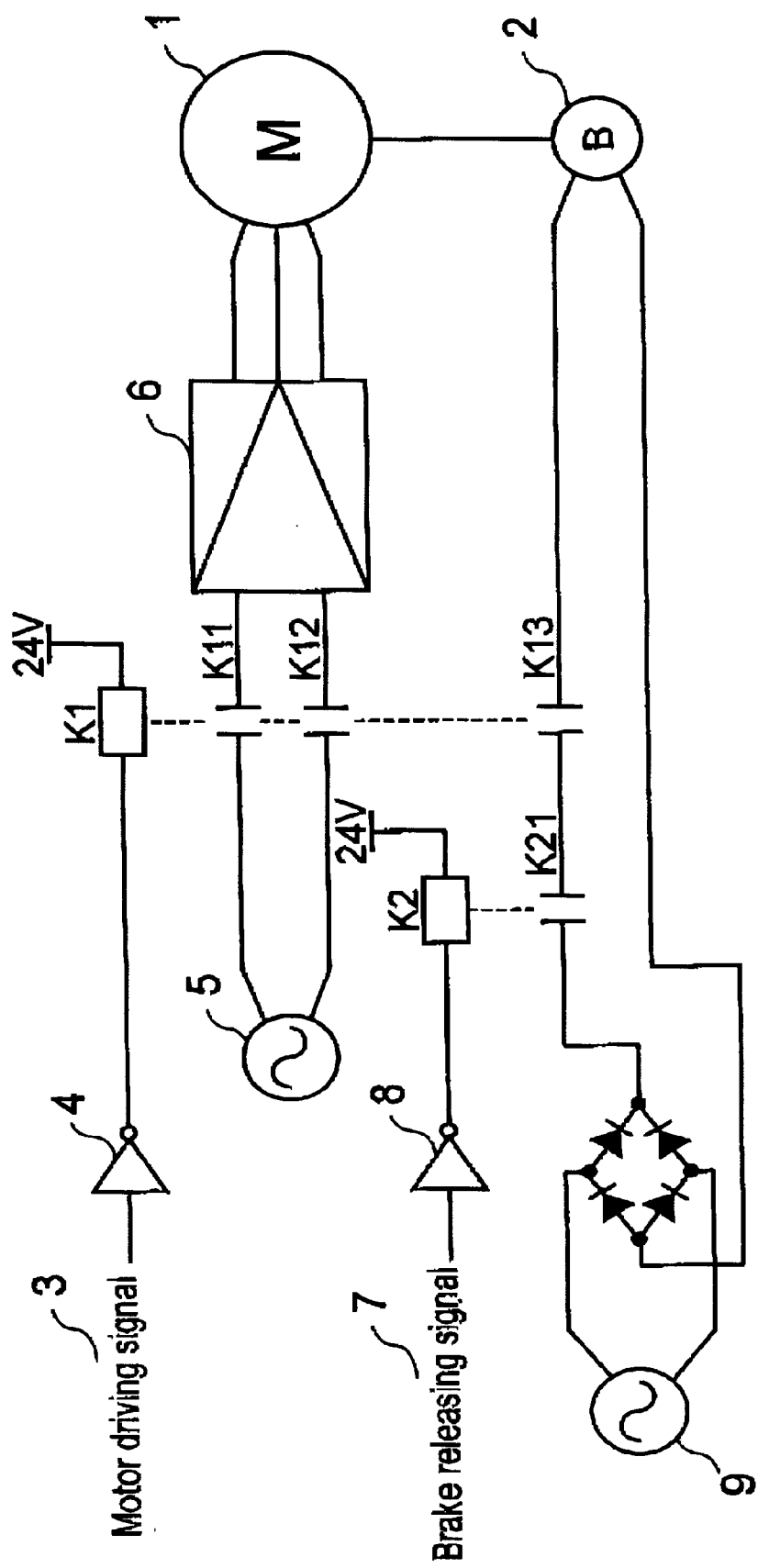
FIG. 1 is a circuit diagram of a motor driving device and a motor-brake-releasing-device in accordance with a first exemplary embodiment of the present invention.

FIG. 1 is a circuit diagram of a motor driving device and a motor-brake-releasing-device in accordance with the first exemplary embodiment of the present invention. In the first embodiment shown in FIG. 1, a power supply for releasing an electromagnetic brake, which locks a motor shaft, is supplied to the brake in an AND form, whereby the motor-brake-releasing-device releases the brake. The AND form is produced by a relay contact (switch), which turns conductive at operating the motor, and another relay contact (switch), which turns conductive at permitting the motor to operate.

In the first embodiment shown in FIG. 1, the following points are different from the circuit diagram shown in FIG. 2: In the first embodiment, third contact K13 of relay K1—contact K13 being energized when motor-driving-signal 3 turns active—is coupled to a power line of a brake-releasing-power-supply in series. Contact K13 turns conductive when motor-driving-signal 3 turns active.

This structure allows two contacts K13 and K21 to be coupled in series, and provides a power supply for releasing brake 2 via these two contacts, whereby brake 2 can be released only when the motor is driven (contact K 13 is closed) and the motor brake is permitted to be released (contact K21 is closed).

In the first embodiment as discussed above, the power for releasing the brake is supplied to the electromagnetic brake following the result of AND signal produced by the motor-driving-signal and the brake-release-permitting-signal. The brake is released as discussed above, thus the brake is never released when the motor is not driven. As a result, the structure shown in FIG. 1 provides a safer mechanism than that shown in FIG. 2. Further, since two relay contacts K21, K13 are coupled in series, there are less chances for the contacts to be melt comparing with a single contact shown in FIG. 2.

Second Exemplary Embodiment

Figure 3:
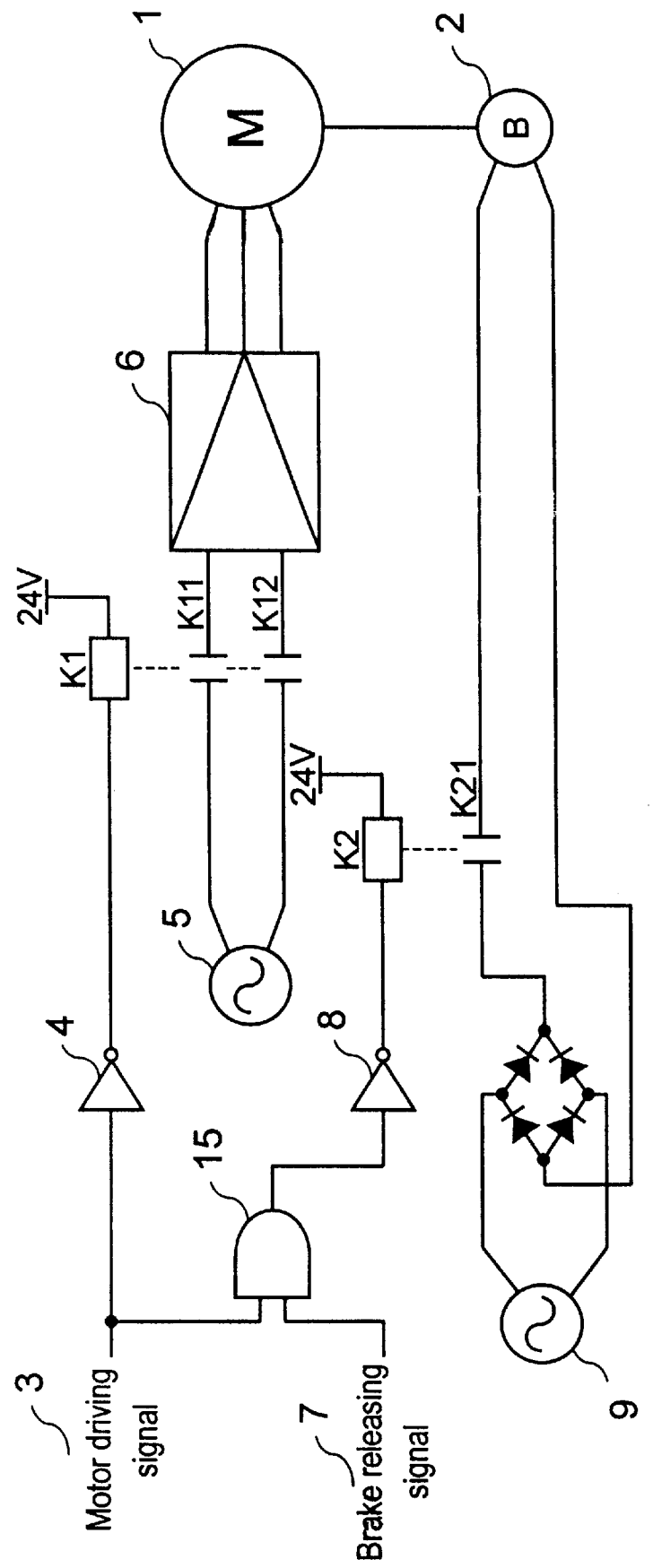
FIG. 3 is a circuit diagram of a motor driving device and a motor-brake-releasing-device in accordance with a second exemplary embodiment of the present invention.

FIG. 3 is a circuit diagram of a motor driving device and a motor-brake-releasing-device in accordance with the second exemplary embodiment of the present invention. In FIG. 3, the same elements as those in FIG. 2 are denoted with the same reference marks and the descriptions thereof are omitted.

A feature of the second embodiment is to input motor-driving-signal 3 and brake-releasing-signal 7 to AND gate 15, and an output terminal of gate 15 is coupled to relay K2 via driver 8. Instead of AND gate 15, the AND of motor-driving-signal 3 and brake-releasing-signal 7 can be produced by software, thereby controlling relay K2 via driver 8.

In the second embodiment, the power for releasing the brake is supplied to the electromagnetic brake following the result of AND signal produced by the motor-driving-signal and the brake-release-permitting-signal. Since the brake is released as discussed above, the brake is never released when the motor is not driven. As a result, the structure shown in FIG. 3 provides a safer mechanism than that shown in FIG. 2.

Third Exemplary Embodiment

Figure 4:
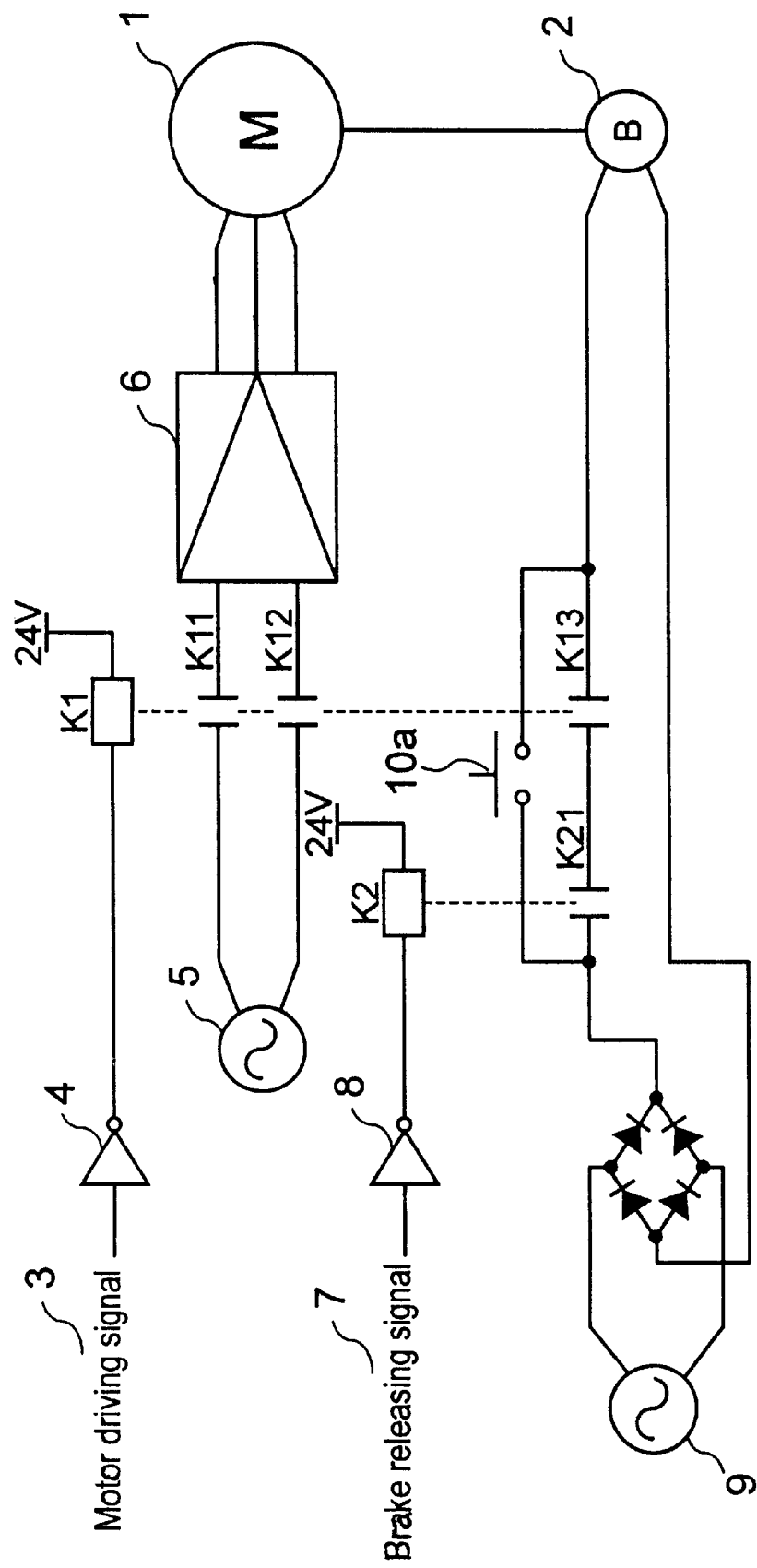
FIG. 4 is a circuit diagram of a motor driving device and a motor-brake-releasing-device in accordance with a third exemplary embodiment of the present invention.

FIG. 4 is a circuit diagram of a motor driving device and a motor-brake-releasing-device in accordance with the third exemplary embodiment of the present invention. In the third embodiment, the power supply of the electromagnetic brake can be released by an operator when the motor is not driven. In FIG. 4, the same elements as shown in FIG. 1 are denoted with the same reference marks, and the descriptions thereof are omitted.

In the first embodiment illustrated in FIG. 1, when both contacts K13 and K21 are closed by a servo control system, a power supply derived from the full-wave rectification of ac power supply 9 is supplied to brake 2 and releases brake 2.

In FIG. 1, if a final object of motor 1 is interfered with a jig or the like, the servo control system detects excess load, which shuts off both a motor-driving-system and a brake system. In this case, a power supply of the servo control system is once turned off, then turned on again and necessary steps for correcting the interference status are taken for removing the interference from the final object.

However, if the final object is heavily interfered and is applied with large force, and when offset load is applied to the shaft of motor 1, servo lock status cannot be maintained although an operator tries to drive motor 1. Thus servo amplifier 6 detects overload and shouts off instantly after the servo control system is powered on. Therefore, the interference may not be avoided, and if not, another way to avoid the interference should be taken, i.e., fixed sections which fix the entire machine are dismounted and the entire machine must be moved.

In the third embodiment shown in FIG. 4, momentary switch 10a is coupled to contacts K13 and K21 in parallel so that switch 10a bypasses a series connection of contacts K13 and K21. If the servo control system is powered on, i.e., ac power supply 9 is powered on, this structure allows brake 2 to be released while an operator depresses switch 10a without driving motor 1. The interference with the final object can be avoided thanks to this mechanism. When equipment including the device of the present invention is moved to another place, an operator can change a posture of the final object without using a power supply of the equipment. This is another advantage of the third embodiment.

Fourth Exemplary Embodiment

Figure 5:
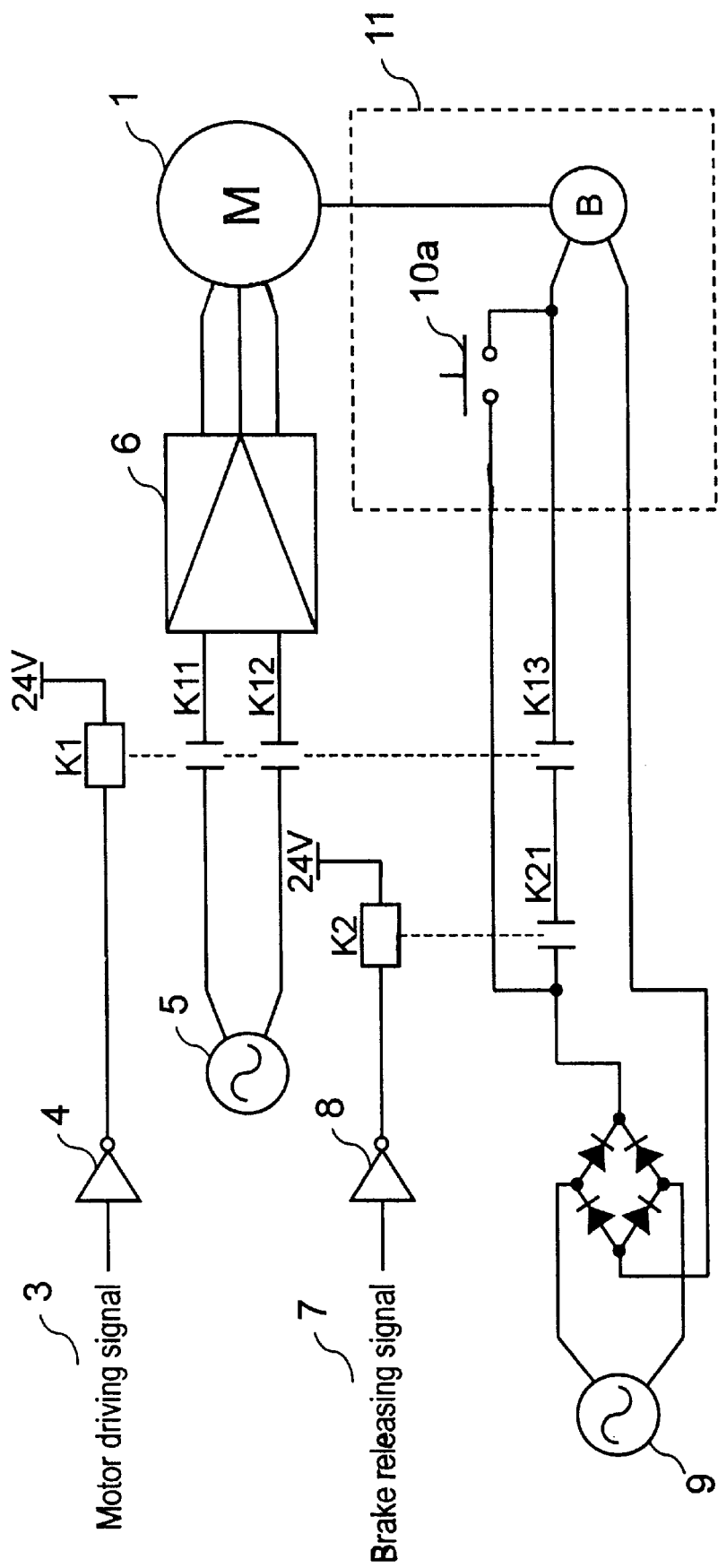
FIG. 5 is a circuit diagram of a motor driving device and a motor-brake-releasing-device in accordance with a fourth exemplary embodiment of the present invention.

FIG. 5 is a circuit diagram of a motor driving device and a motor-brake-releasing-device in accordance with the fourth exemplary embodiment of the present invention. The fourth embodiment shown in FIG. 5 differs from the third embodiment shown in FIG. 4 in the following point: In the fourth embodiment, switch 10a is disposed at machine 11 including the brake. Therefore, even if a controller is away from the final object, the removal operation of the interference with the final object can be carried out with ease near the final object.

Fifth Exemplary Embodiment

Figure 6:
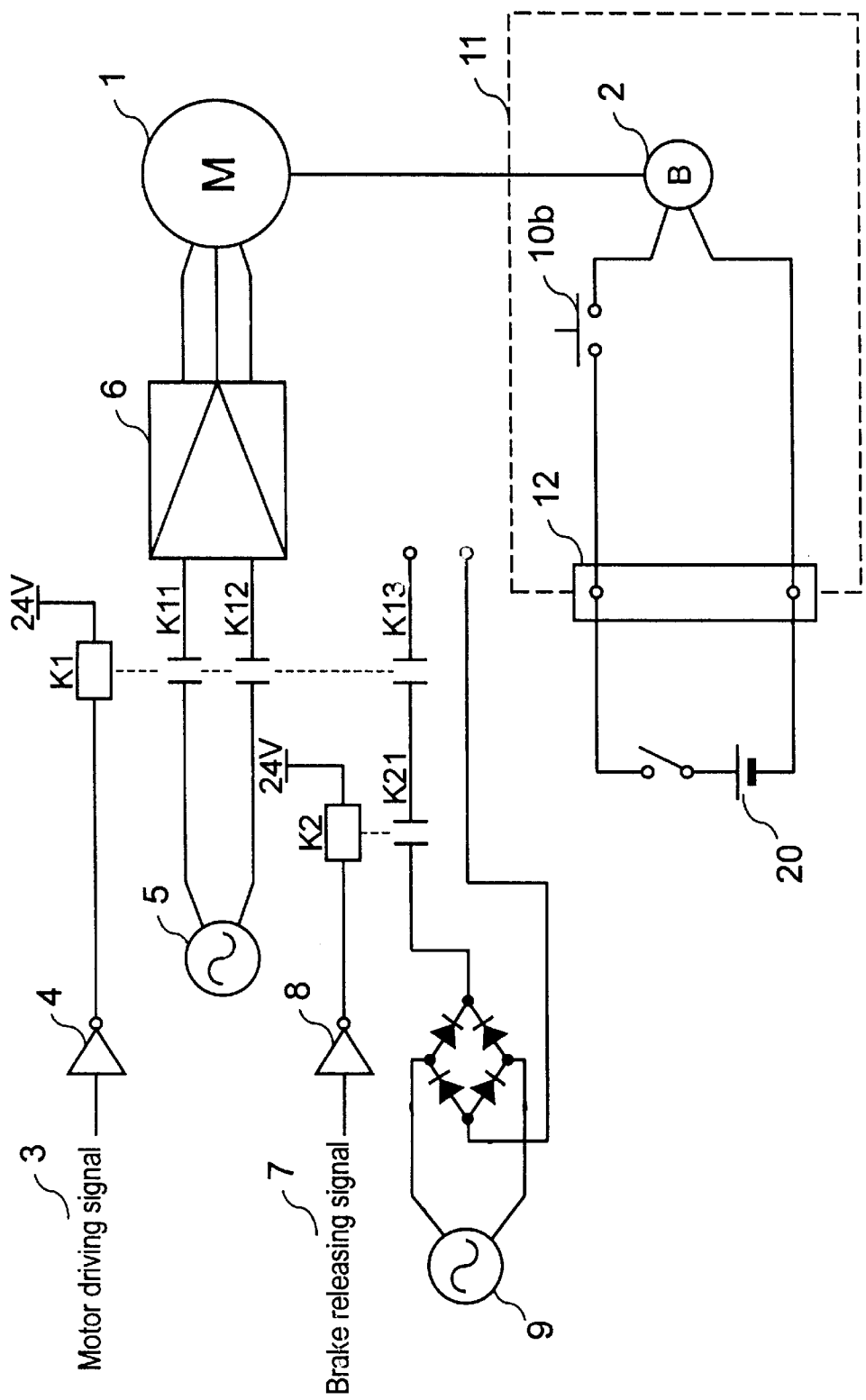
FIG. 6 is a circuit diagram of a motor driving device and a motor-brake-releasing-device in accordance with a fifth exemplary embodiment of the present invention.

FIG. 6 is a circuit diagram of a motor driving device and a motor-brake-releasing-device in accordance with the fifth exemplary embodiment of the present invention. In the fifth embodiment, a battery is used as a power supply for releasing an electromagnetic brake.

To be more specific, in the fifth embodiment shown in FIG. 6, connecting cables—shown in FIG. 5 of the fourth embodiment—between ac power supply 9 (e.g. a commercial power supply) and machine 11 are dismounted, and machine 11 is coupled to battery 20 via connector 12 instead. Without connection to ac power supply 9, using battery 20 allows the brake to be released. As such, the battery 20 is used as the power supply for releasing the electromagnetic brake, thus the motor brake can be released even in the condition where an ac power supply is not available.

Sixth Exemplary Embodiment

Figure 7:
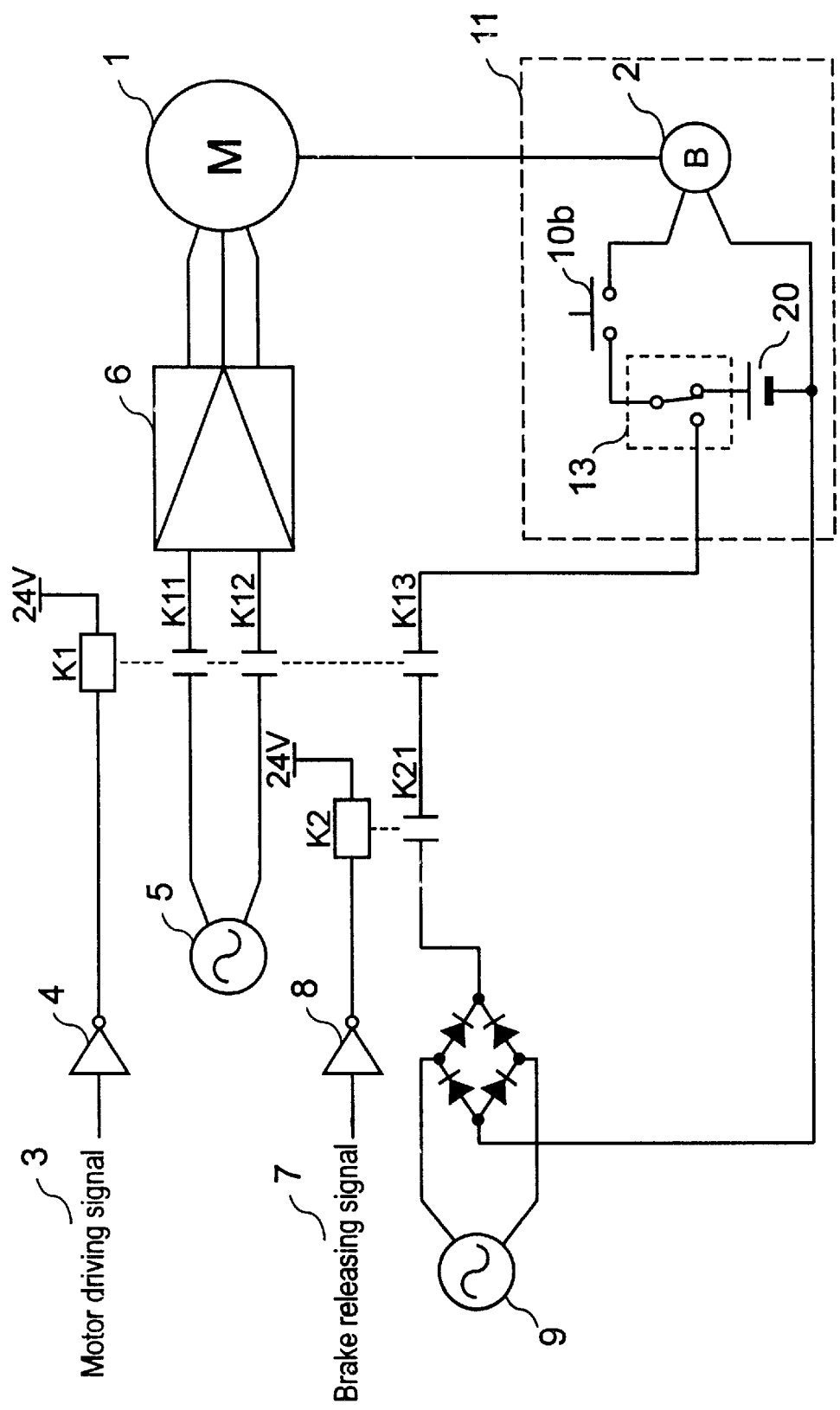
FIG. 7 is a circuit diagram of a motor driving device and a motor-brake-releasing-device in accordance with a sixth exemplary embodiment of the present invention.

FIG. 7 is a circuit diagram of a motor driving device and a motor-brake-releasing-device in accordance with the sixth exemplary embodiment of the present invention. In this embodiment, battery 20 is used as another power supply for releasing the brake in addition to a dc power supply which is derived from the full-wave rectification of ac power supply 9 (e.g. commercial power supply). The power cable of this dc power supply is not necessarily dismounted. As shown in FIG. 7, alternate switch 13 is disposed in machine 11 for switching ac power supply 9 to battery 20 or vice versa as a brake-releasing-power-supply. This structure allows electrical collision between a dc power supply—derived from the full-wave rectification of ac power supply 9—and battery 20 to be avoided because when the brake-releasing-power-supply is switched to battery 20, the power line from the dc power supply is cut off simultaneously.

Seventh Exemplary Embodiment

FIG. 8 is a circuit diagram of a motor driving device and a motor-brake-releasing-device in accordance with the seventh exemplary embodiment of the present invention. In the seventh embodiment, the battery is protected from spark-noise (counter electromotive force) due to an electromagnetic-brake-coil when the power supply of the electromagnetic brake is shut off.

When the releasing-power-supply of brake 2 is switched to battery 20 and momentary switch 10b for releasing the motor brake is turned open from being closed, the counter electromotive force due to the coil of brake 2 occurs at the grounding side of the power line. The potential of this negative voltage is more than twice of the power supply voltage. If this negative voltage is repeatedly applied, a voltage-regulation-capacitor (not shown) and battery 20 may be damaged. The voltage-regulation-capacitor is, e.g., a smoothing capacitor for a dc voltage derived from the full-wave-rectification of ac power supply 9. Thus as shown in FIG. 8, diode 14 is coupled as follows in order to absorb the negative voltage: the cathode of diode 14 is coupled to a positive electrode of the brake coil viewed from the releasing-power-supply of the motor brake, and the anode of diode 14 is coupled to a negative electrode (grounding) of the brake coil. In other words, diode 14 is coupled in parallel with the brake coil, i.e., diode 14 functions as a flywheel-diode (damper diode) and absorbs the negative voltage (surge voltage.)

This structure allows the voltage-regulation-capacitor and the battery to be protected from the negative voltage (surge voltage) produced on the grounding side of the power line of the power supply for releasing the motor brake. The negative voltage is produced due to the counter-electromotive-force by the coil of the electromagnetic brake when the power supply is shut off.

What is claimed is:

1. A motor brake releasing device comprising:
    an electromagnetic brake for locking a motor shaft; and
    a switch disposed between said electromagnetic brake and a releasing-power-supply of said brake, and said switch being operated by an AND signal produced by a motor-driving-signal and a motor-brake-release-permitting signal.

2. The motor brake releasing device of claim 1 further comprising:
    another switch for releasing said electromagnetic brake and disposed in parallel with said switch.

3. The motor brake releasing device of claim 2, wherein said another switch is disposed at a machine side including said electromagnetic brake.

4. A motor brake releasing device comprising.
    an electromagnetic brake for locking a motor shaft;
    a battery as a first power supply for releasing said electromagnetic brake;
    a first switch for releasing a motor brake and disposed between said battery and said electromagnetic brake;
    an ac power supply as a second power supply for releasing said electromagnetic brake; and
    a second switch for switching the releasing power supply to one of said battery (the first power supply) and said ac power supply (the second power supply).

5. The motor brake releasing device of claim 4, wherein. said first and second switches are disposed at a machine side including said electromagnetic brake.

6. The motor brake releasing device of claim 4 further comprising:
    a diode coupled in parallel with said battery and said electromagnetic brake,
    wherein a cathode of said diode is coupled to a positive electrode of a coil of said electromagnetic brake and an anode of said diode is coupled to a negative electrode of the coil of said electromagnetic brake.

7. The motor brake releasing device of claim 5 further comprising:
    a diode coupled in parallel with said battery and said electromagnetic brake,
    wherein a cathode of said diode is coupled to a positive electrode of a coil of said electromagnetic brake and an anode of said diode is coupled to a negative electrode of the coil of said electromagnetic brake.

8. A motor brake releasing device comprising:
    an electromagnetic brake for locking a motor shaft;
    a battery as a first power supply for releasing said electromagnetic brake;
    a first switch for releasing a motor brake and disposed between said battery and said electromagnetic brake;
    a diode coupled in parallel with said battery and said electromagnetic brake,
    wherein a cathode of said diode is coupled to a positive electrode of a coil of said electromagnetic brake and an anode of said diode is coupled to a negative electrode of the coil of said electromagnetic brake.

9. A motor brake releasing device comprising:
    an electromagnetic brake for locking a motor shaft;
    a power supply coupled to the electromagnetic brake;
    a first switch responsive to a motor driving signal coupled in series with the power supply and the electromagnetic brake; and
    second switch responsive to a brake releasing signal coupled in series with the first switch between the power supply and the electromagnetic brake.

10. A motor brake releasing device comprising:
    an electromagnetic brake for locking a motor shaft;
    a power supply coupled to the electromagnetic brake;
    a switch coupled in series with the electromagnetic brake and the power supply; and
    a logical AND circuit including a first input coupled to receive a motor driving signal and a second input coupled to receive a brake releasing signal,
    wherein the switch is responsive to the output of the logical AND circuit to selectively supply power to the electromagnetic brake.

* * * * *